(12) United States Patent
Tang

(10) Patent No.: US 7,694,431 B2
(45) Date of Patent: Apr. 13, 2010

(54) WHEELED DISTANCE MEASURING DEVICE

(76) Inventor: Yi-Wen Tang, 10F.-2, No. 186, Dadun 19th St., Xitun Dist., Taichung City (TW)

( * ) Notice: Subject to any disclaimer, the term of this patent is extended or adjusted under 35 U.S.C. 154(b) by 16 days.

(21) Appl. No.: 12/185,135

(22) Filed: Aug. 4, 2008

(65) Prior Publication Data
US 2010/0024235 A1 Feb. 4, 2010

(51) Int. Cl.
G01B 3/12 (2006.01)
F16B 7/12 (2006.01)

(52) U.S. Cl. .............................. 33/772; 33/773; 33/775; 403/109.2; 403/109.8

(58) Field of Classification Search .................. 33/734, 33/735, 772–782; 135/65, 75, 80, 81, 85, 135/114, 127, 142; 285/80; 403/93, 90, 403/92, 101, 109.2, 109.3, 109.8
See application file for complete search history.

(56) References Cited
U.S. PATENT DOCUMENTS

| 3,446,523 A * | 5/1969 | Little ......................... 135/114 |
|---|---|---|
| 3,616,541 A * | 11/1971 | Crayton ........................ 33/781 |
| 5,066,049 A * | 11/1991 | Staples ......................... 285/80 |
| 6,073,642 A * | 6/2000 | Huang ......................... 135/114 |
| 2003/0235463 A1* | 12/2003 | Neumann et al. ........... 403/329 |
| 2006/0156573 A1* | 7/2006 | Huang ......................... 33/772 |
| 2007/0084076 A1* | 4/2007 | Wang ........................... 33/772 |
| 2007/0236005 A1* | 10/2007 | Chang ......................... 285/80 |
| 2009/0120480 A1* | 5/2009 | Takayama .................... 135/114 |
| 2009/0289449 A1* | 11/2009 | Hasunuma et al. ............ 285/33 |

* cited by examiner

Primary Examiner—G. Bradley Bennett
(74) Attorney, Agent, or Firm—WPAT, P.C.; Anthony King; Kay Yang

(57) ABSTRACT

A wheeled distance measuring device includes a wheel with a measuring unit connected to a side of the wheel and a pole unit is connected to the wheel, the pole unit includes a first section, a second section and a third section. The first section has two first holes and two second holes defined in two ends thereof. The first section is movably inserted into the second section which has two third holes and movably inserted into the third section which has two fourth holes. Two positioning units are respectively located between the first and second section, and between the second and third sections. The positioning units control the retractable movement of the sections so as to adjust the length of the pole unit. A handle is connected to the pole unit and controls the positioning units by an action rod.

13 Claims, 15 Drawing Sheets

A-A

WHEELED DISTANCE MEASURING DEVICE

FIELD OF THE INVENTION

The present invention relates to a distance measuring device, an more particularly, to a wheeled distance measuring device having a retractable pole so as to reduce space occupied.

BACKGROUND OF THE INVENTION

A conventional distance measuring device is disclosed in U.S. Pat. No. 7,040,036 to Hui Chen Wang who is the wife of applicant and includes a wheel rotatably connected to a pole and a measuring unit is connected to a side of the wheel. The wheel includes a radius and rolls against a surface and the number of revolutions of the wheel can be counted by a counter so as to have the distance that the wheel travels. A handle is connected to the other end of the pole and includes a brake key and an initialization key, two respective cables are connected to the brake key and the initialization key so as to brake the wheel and initialize the counter. The pole is composed of sections which are foldably connected to each other and a positioning unit is located in the sections so as to control the relative positions of the sections of the pole.

However, the pole can only be folded to be two parallel sections at the mediate portion of the pole so that the folded status of the device still occupies a lot of space. The foldable pole cannot meet different requirements for users of different heights.

The present invention intends to provide a wheel distance measuring device which includes a retractable pole which can be collapsed to a short section and the length of the pole can be adjusted for different users' needs.

SUMMARY OF THE INVENTION

The present invention relates to a wheeled distance measuring device which comprises a wheel with a measuring unit connected to a side of the wheel. A pole unit is connected to the wheel and includes a first section, a second section and a third section. The first section is movably inserted into the second section which is movably inserted into the third section. The first section has two first holes which are aligned with two second holes in the second section, and the second section further has two third holes which are aligned with two fourth holes in the third section. A first positioning unit and a second positioning unit are located in the pole unit and each include a first piece, positioning members and a second piece. The first positioning unit is located between the first and second sections and the second positioning unit is located between the second and third sections. An action rod has a first end inserted into the pole unit via a second end of the first section and the first end of the action rod contacts the first piece of the first positioning unit. The second end of the action rod is connected with a handle connected on a top of the pole unit. The positioning members of the first positioning unit are engaged with the first and second holes when the first and second sections are in extended position. The positioning members of the first positioning unit are removed from the second holes by pushing the action rod to move the first piece so that the first and second sections are retractable to each other.

The positioning members of the second positioning unit are engaged with the third and fourth holes when the second and third sections are in extended position. The positioning members of the second positioning unit are removed from the fourth holes by moving the first piece of the second positioning unit so that the second and third sections are retractable to each other.

The primary object of the present invention is to provide a retractable pole unit of a wheeled distance measuring device and the poly unit can be adjusted to a short section when not in use by easily operation of a action rod on the handle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
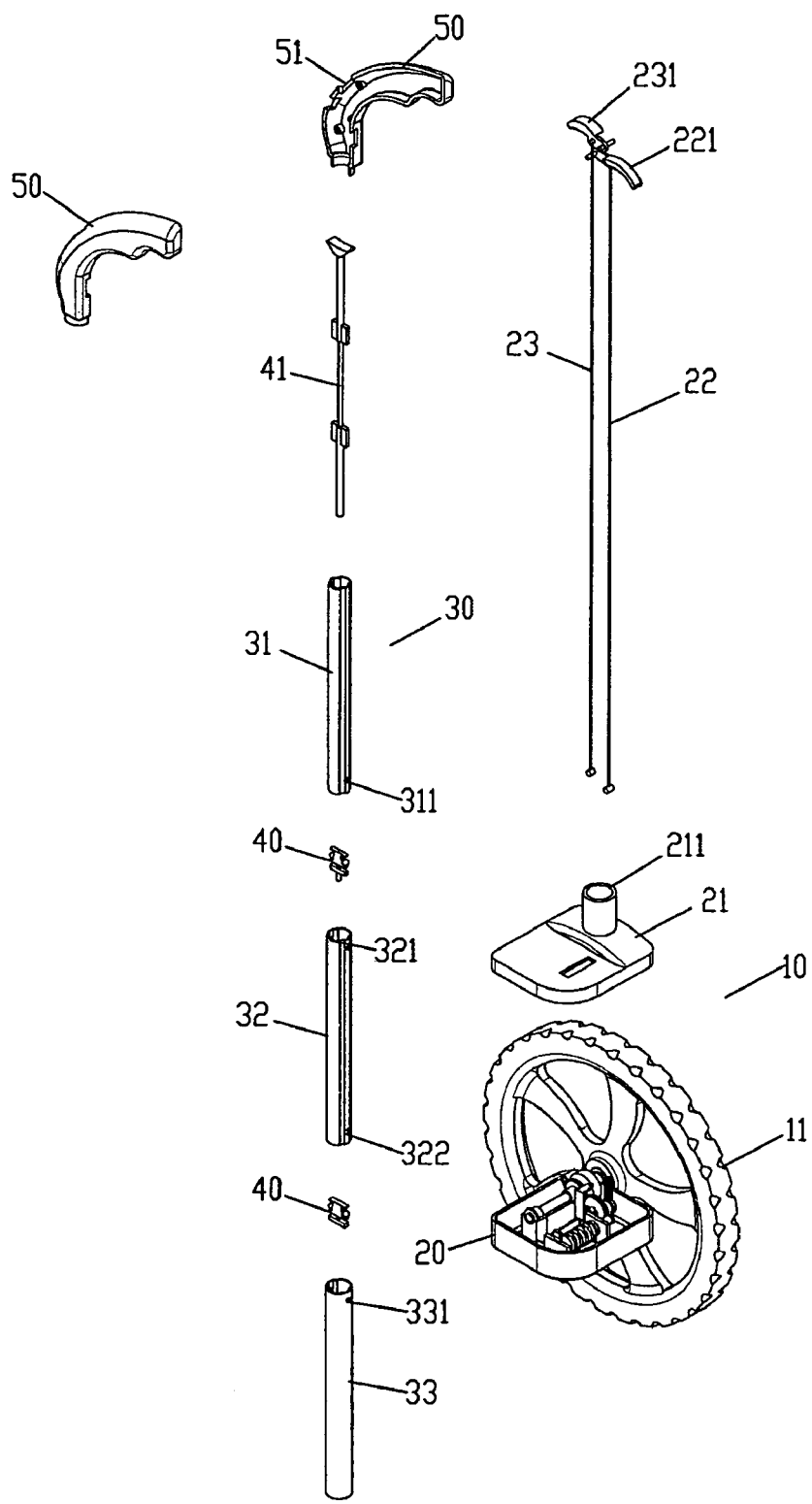
FIG. 1 is an exploded view to show the wheeled distance measuring device of the present invention.
Figure 2:
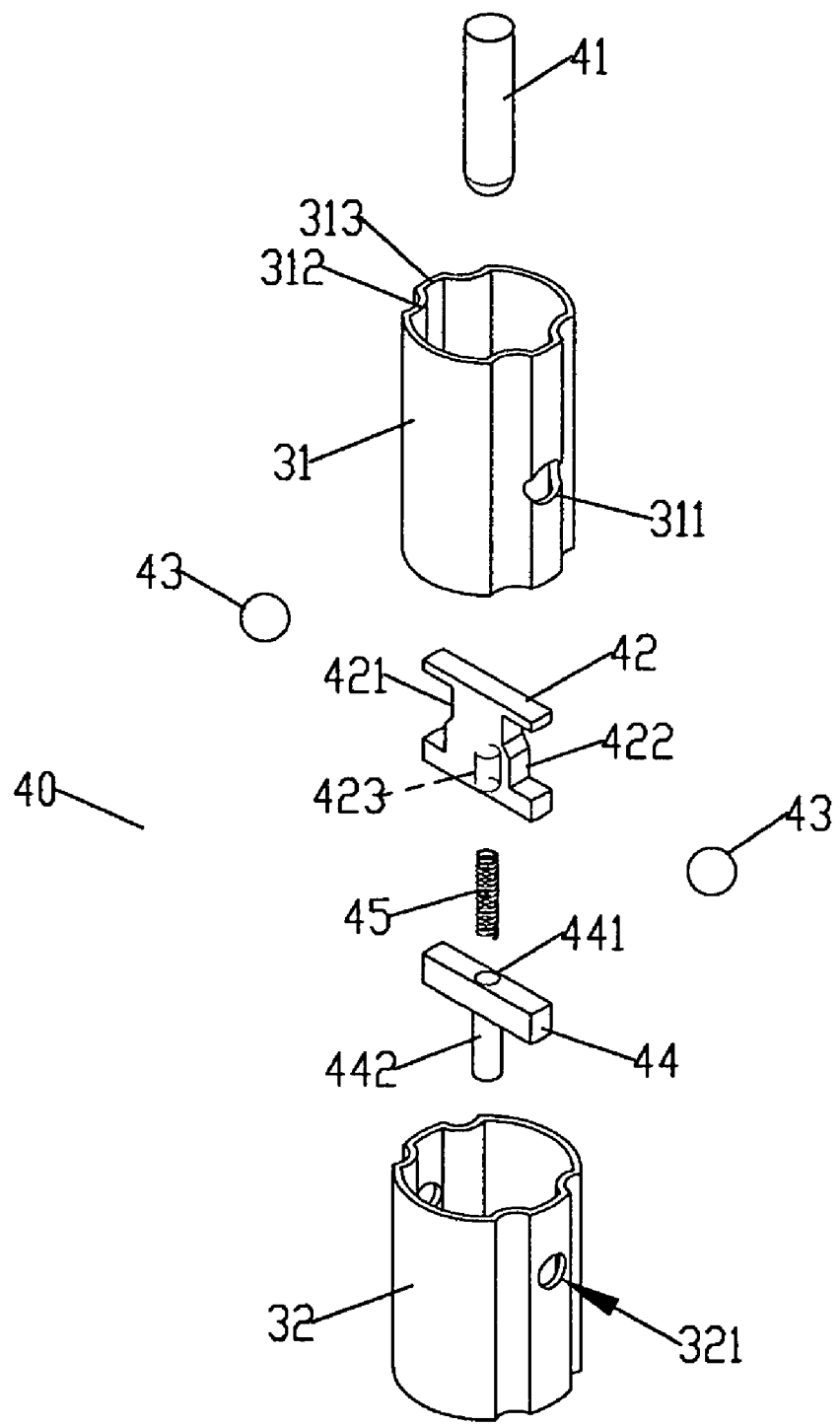
FIG. 2 is an exploded view to show the first and second sections of the pole unit and the positioning unit of the present invention.
Figure 3:
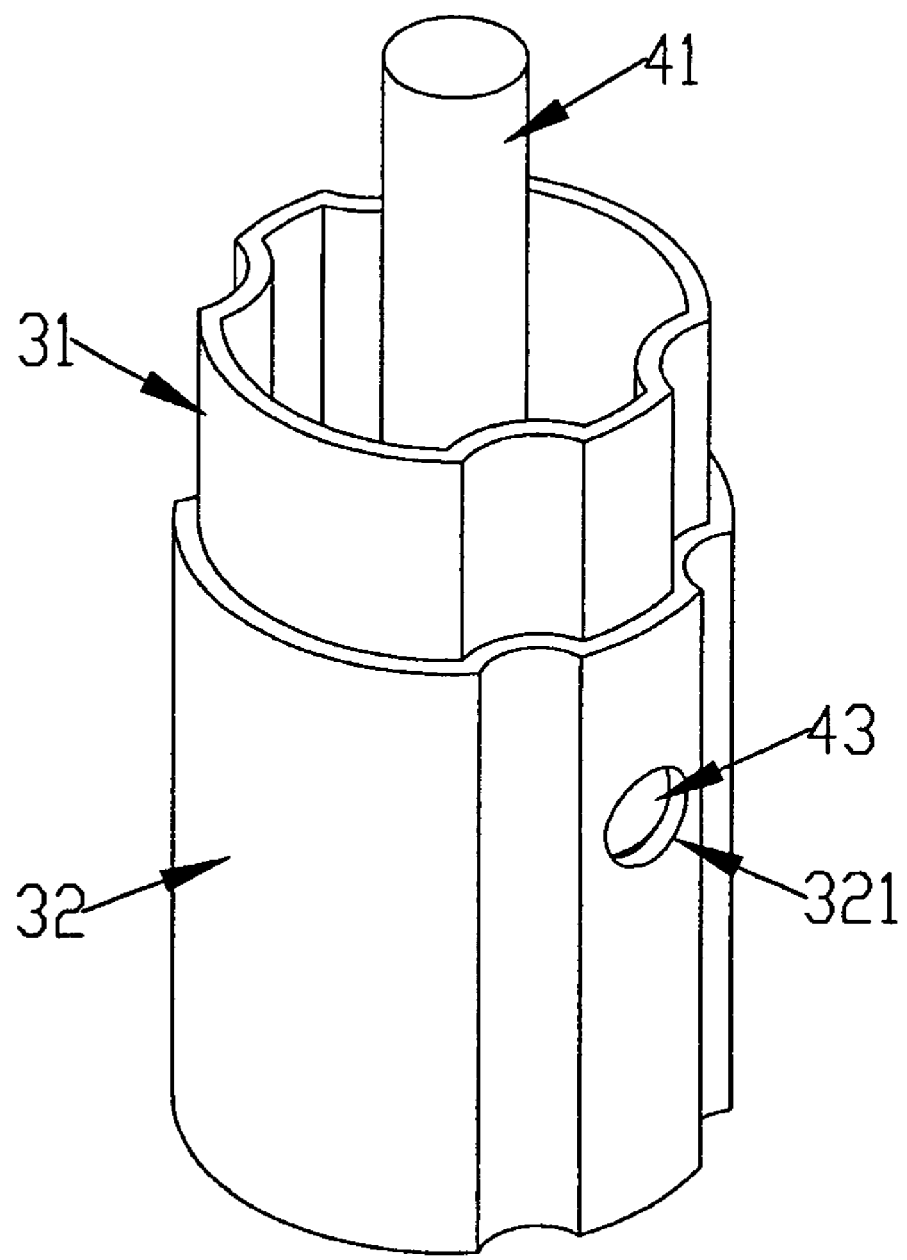
FIG. 3 is a perspective view to show the first and second section retractably connected to each other.
Figure 5:
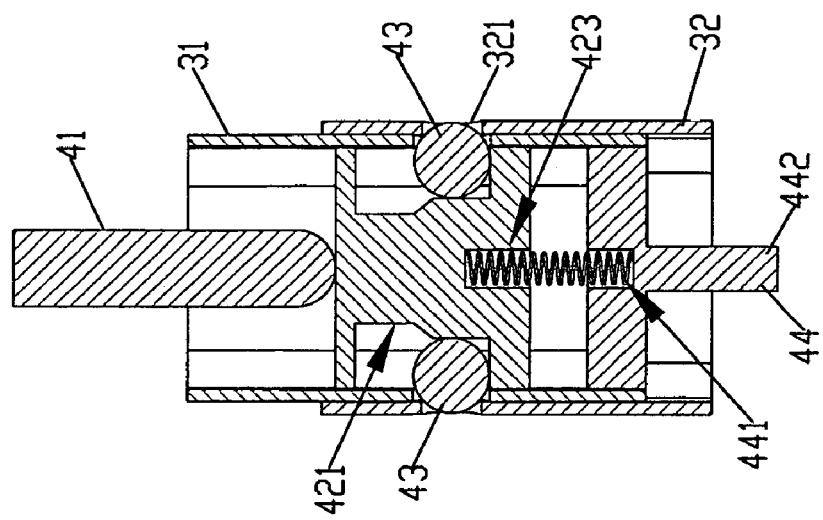
FIG. 5 is a cross sectional view taken along line A-A of FIG. 4.
Figure 4:
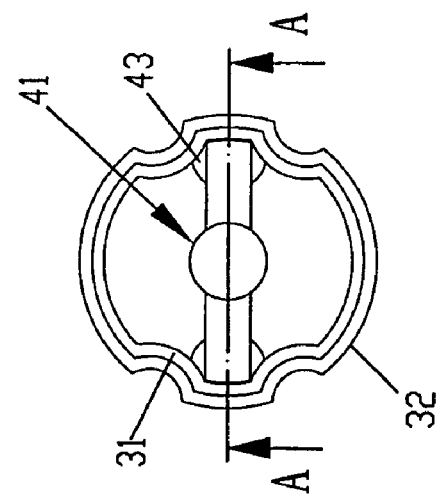
FIG. 4 is a top view to show the positioning unit received in the first and second section of the pole unit of the present invention.
Figure 6:
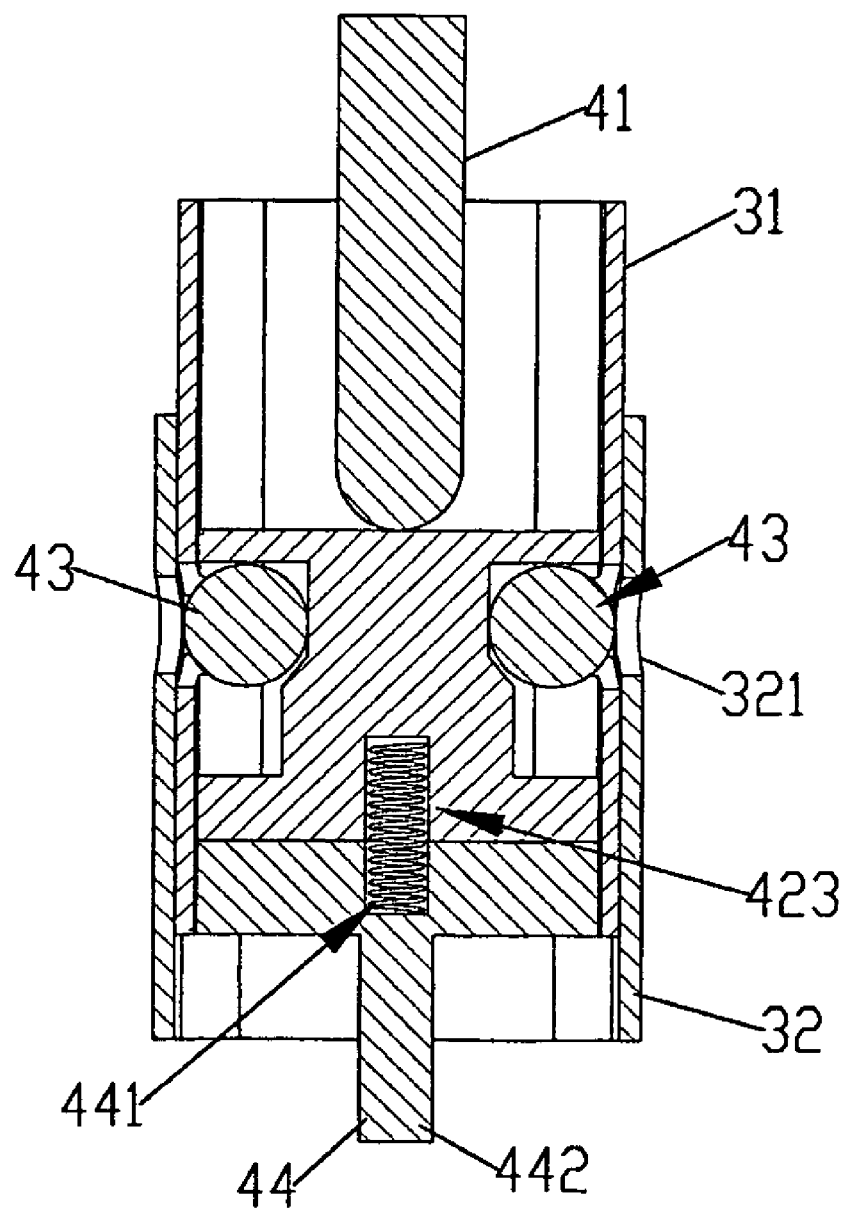
FIG. 6 is a cross sectional view to show that the first piece is pushed downward to disengage the positioning members from the second holes in the second section.
Figure 7:
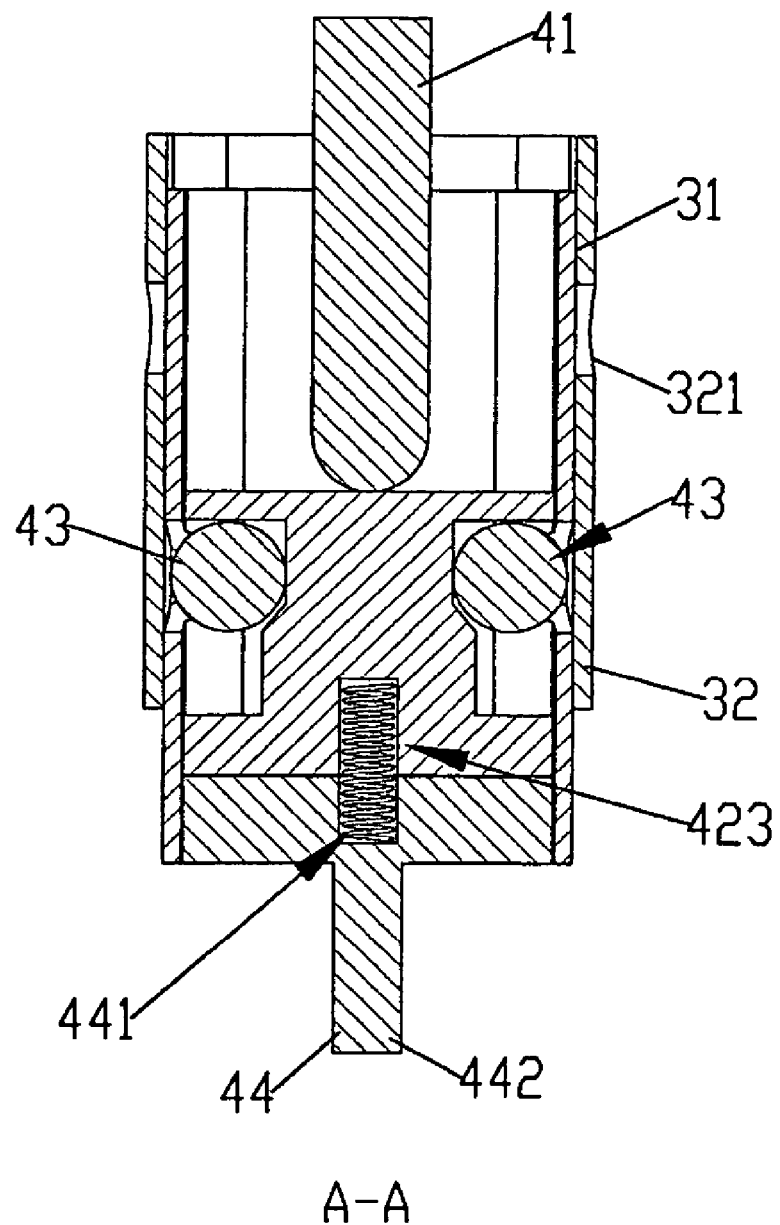
FIG. 7 is a cross sectional view to show that the first section is movable in the second section.
Figures 8, 9:
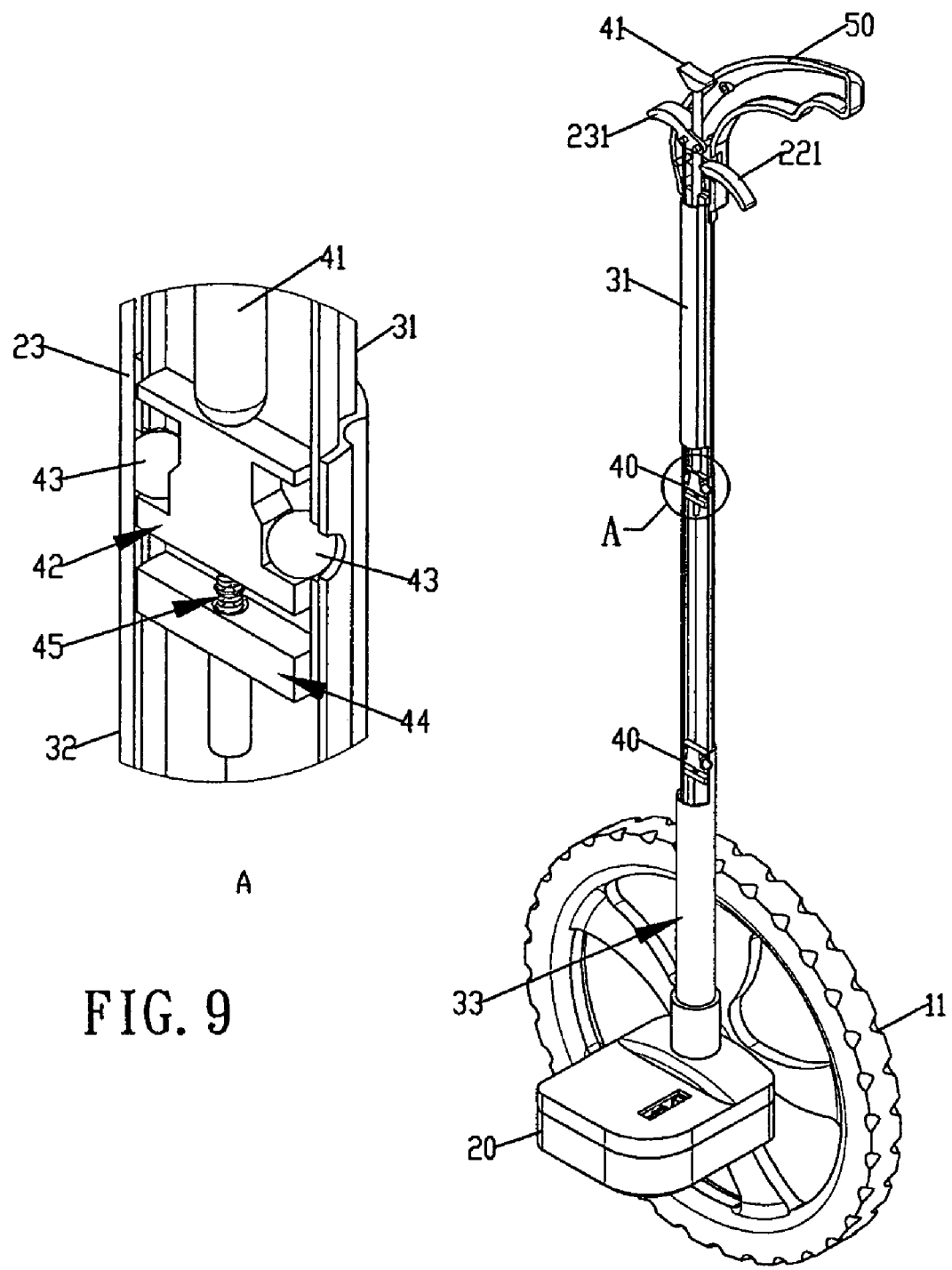
FIG. 8 is a perspective view, partly removed, to show the wheeled distance measuring device of the present invention.
FIG. 9 shows the positioning members are engaged with the first and second holes of the present invention.
Figure 10:
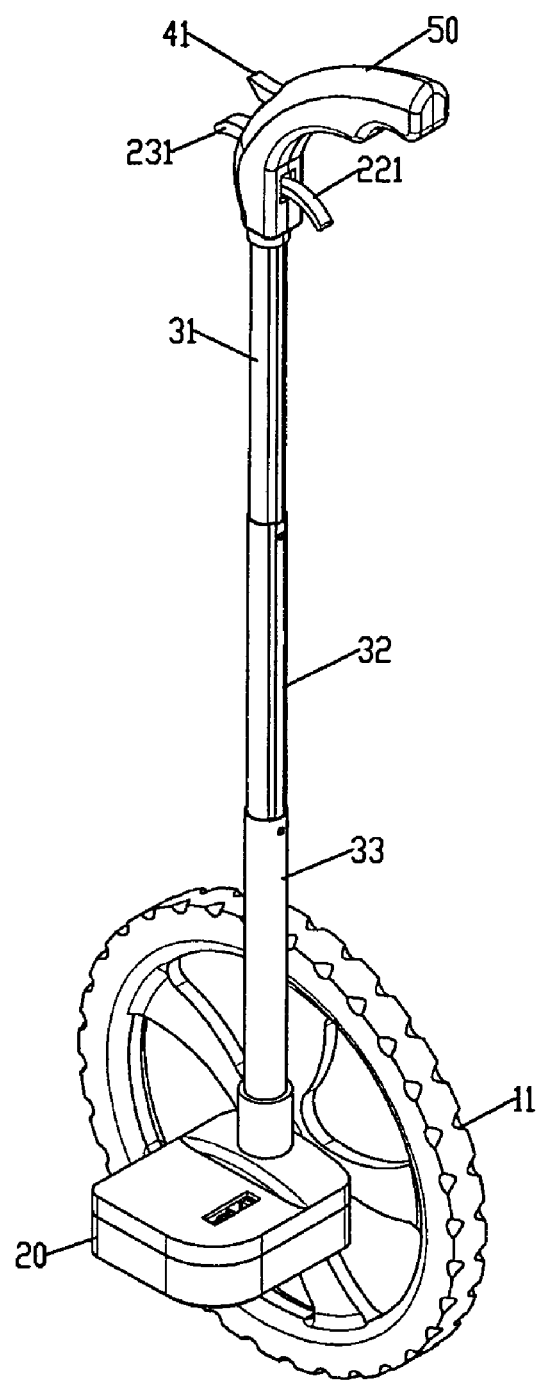
FIG. 10 is a perspective view to show the wheeled distance measuring device of the present invention.

Referring to FIGS. 1 to 3, the wheeled distance measuring device 10 of the present invention comprises a wheel 11 with a measuring unit 20 connected to a side of the wheel 11. The measuring unit 20 includes counter to calculate the number of revolutions of the wheel 11 travels. A cover 21 is connected to a top opening of the measuring unit 20 and includes a tube 211 extending from a top of the cover 21. A pole unit 30 is connected to the tube 211. A handle 50 is connected to a top of the pole unit 30 and composed of two parts. A slot 51 is defined through the handle 50. A brake cable 22 and an initialization cable 23 extend through the pole unit 30 and the tube 211. The brake cable 22 is connected to and brakes the wheel 11 by pulling a brake key 221 pivotably connected to the handle 50. The initialization cable 23 is connected to the measuring unit 20 and initializes the counter of the measuring unit 20 by pulling an initialization key 231 pivotably connected to the handle 50.

The pole unit 30 includes a first section, 31, a second section 32 and a third section 33. The first section 31 has two first holes 311 defined through a wall located close to a first end thereof and the first end of the first section 31 is movably inserted into a first end of the second section 32. The second section 32 has two second holes 321 defined through a wall thereof and located close to the first end of the second section 32. Two third holes 322 are defined through the wall of the second section 32 and located close to a second end of the second section 32. The second end of the second section 32 is movably inserted into a first end of the third section 33 which has two fourth holes 331 defined through a wall thereof. The fourth holes 331 are located close to the first end of the third section 33 and a second end of the third section 33 is securely inserted into the tube 211 of the measuring unit 20.

The first section 31 includes two grooves 312 defined axially in an inside thereof and two pairs of sidewalls 312 extend inward from the inside of the first section 31. The two grooves 312 are located between the two pairs of sidewalls 312. The first holes 311 are located to communicate with the grooves 312.

A first positioning unit 40 and a second positioning unit 40 have identical structure and are located in the pole unit 30. Each of the first and second positioning units 40 includes a first piece 42, two positioning members 43 and a second piece 44. The first positioning unit 40 is located between the first and second sections 31, 32 and the second positioning unit 40 is located between the second and third sections 32, 33. An action rod 41 has a first end inserted into the pole unit 30 via a second end of the first section 31 and the first end of the action rod 41 is in contact with the first piece 42 of the first positioning unit 40. A second end of the action rod 41 extends through the slot 51 of the handle 50.

Figure 11:
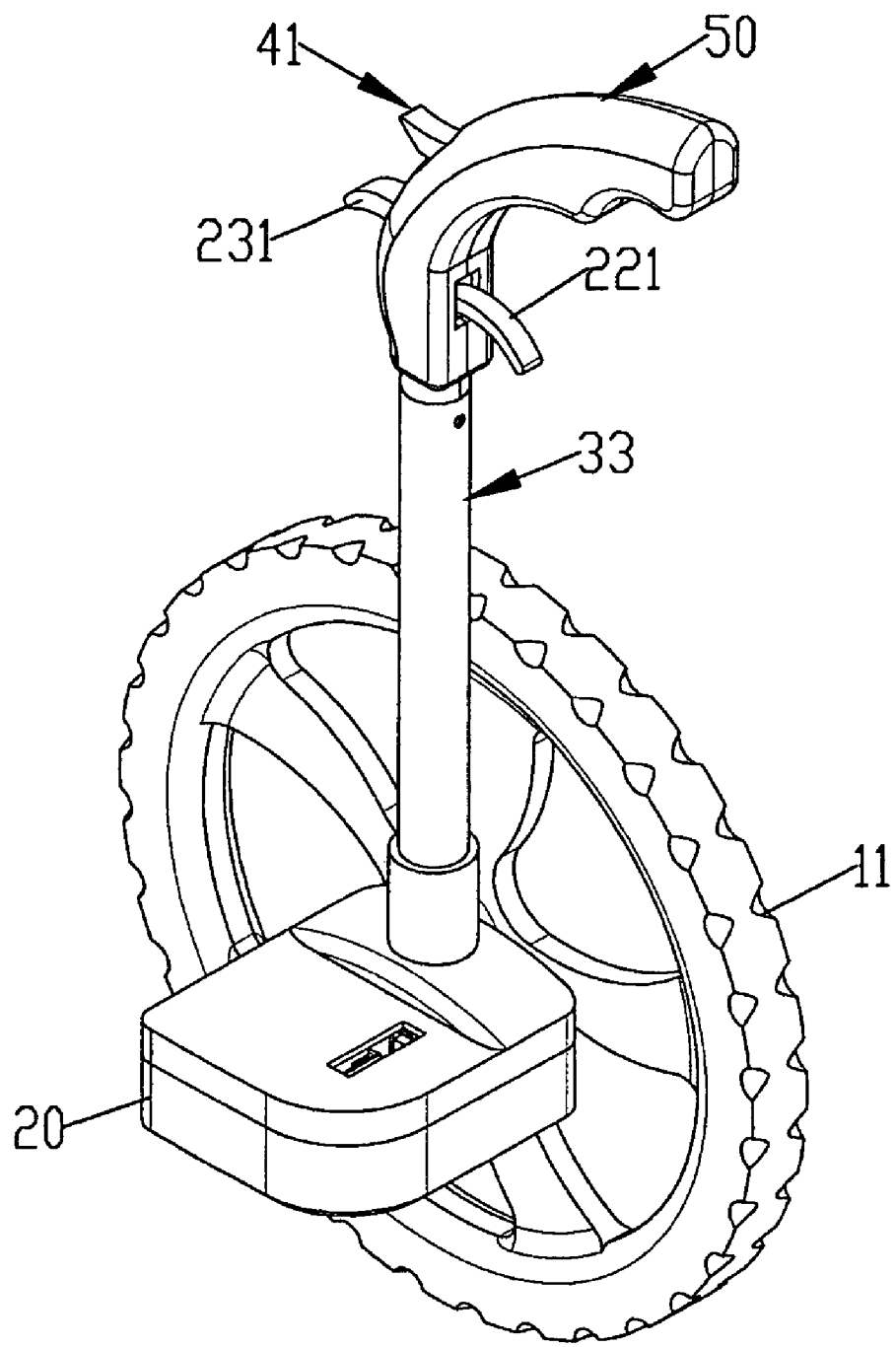
FIG. 11 shows that the first and second sections are retracted in the third section of pole unit.
Figure 12:
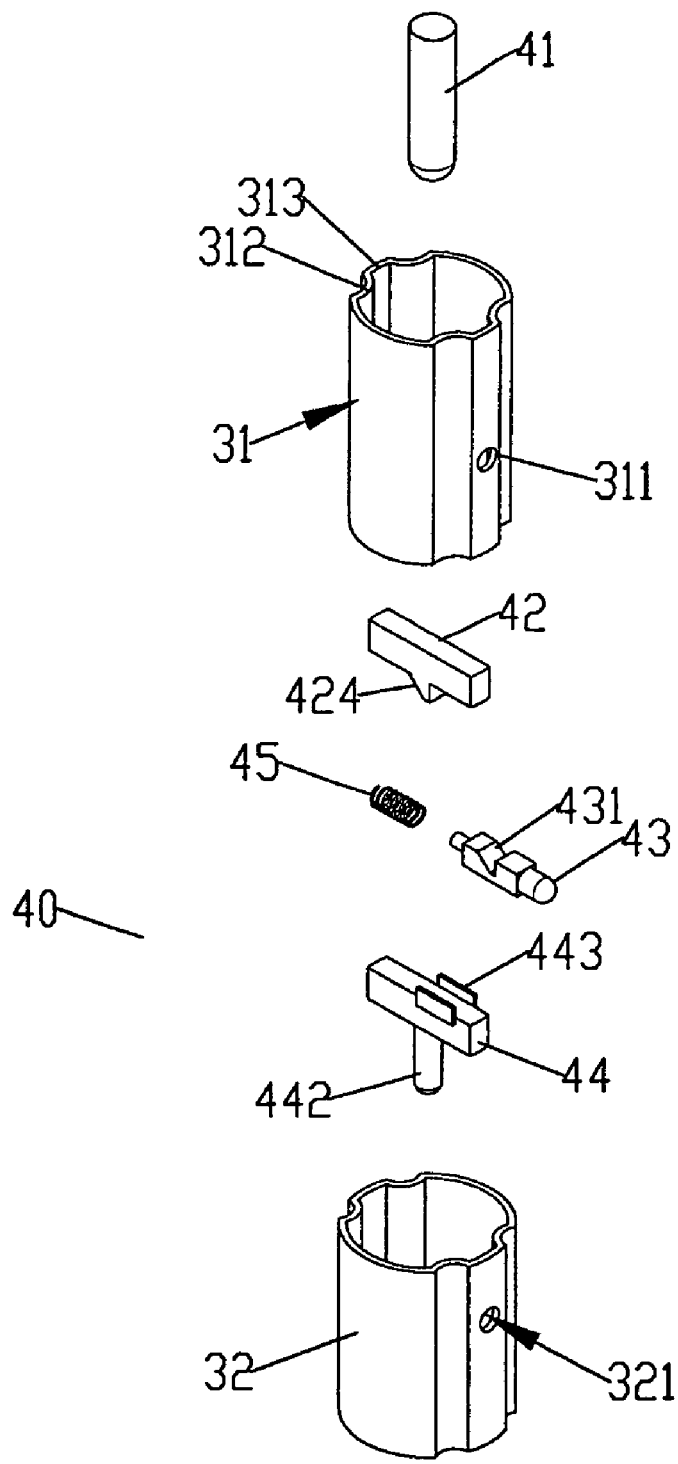
FIG. 12 is an exploded view to show a second embodiment of the positioning unit of the present invention.
Figure 14:
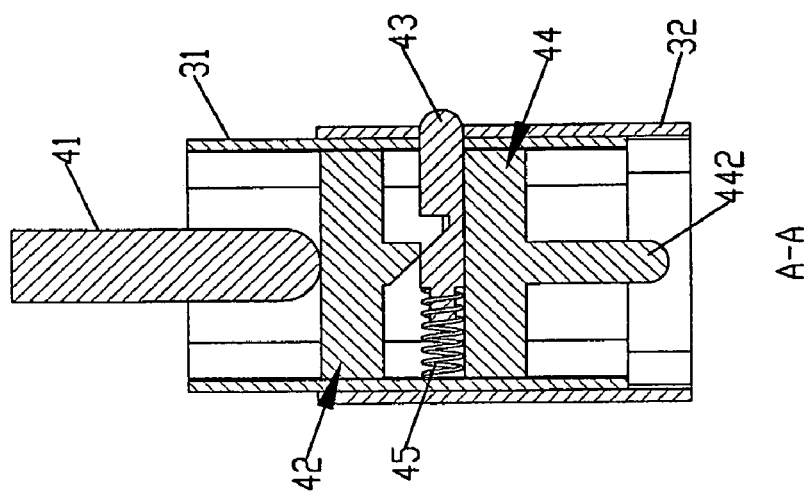
FIG. 14 is a cross sectional view taken along line A-A of FIG. 13.
Figure 13:
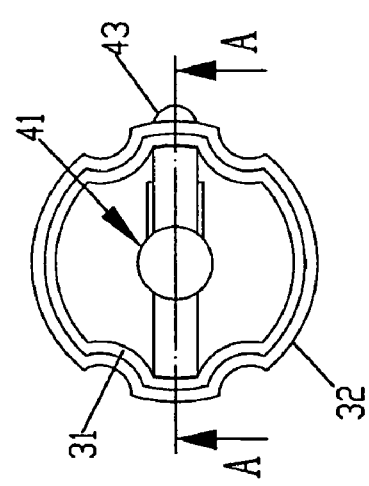
FIG. 13 is a top view to show the positioning unit received in the first and second section of the pole unit of the present invention shown in FIG. 12.
Figure 15:
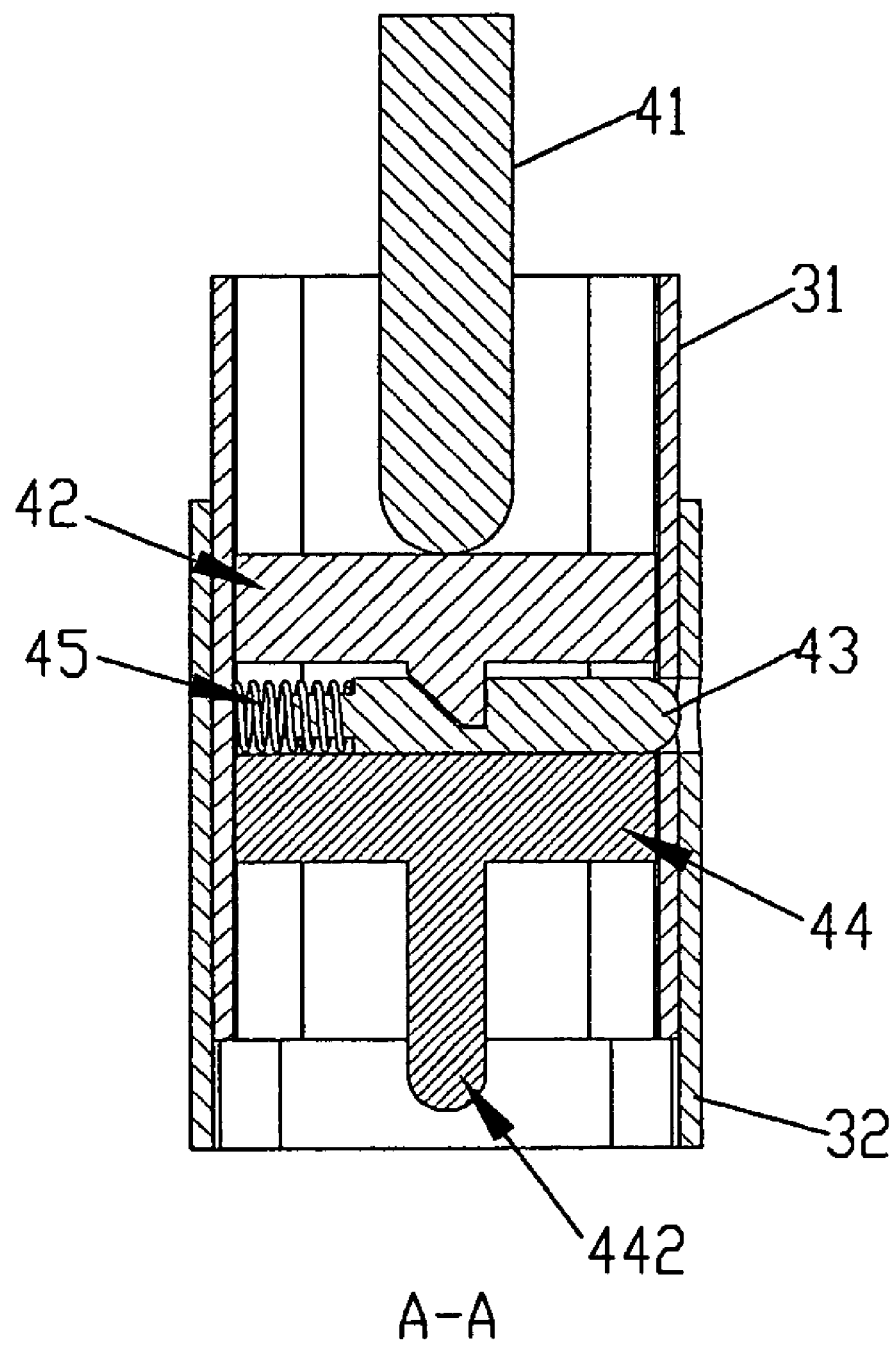
FIG. 15 is a cross sectional view to show that the first piece in FIG. 12 is pushed downward to disengage the positioning member from the second holes in the second section.
Figure 16:
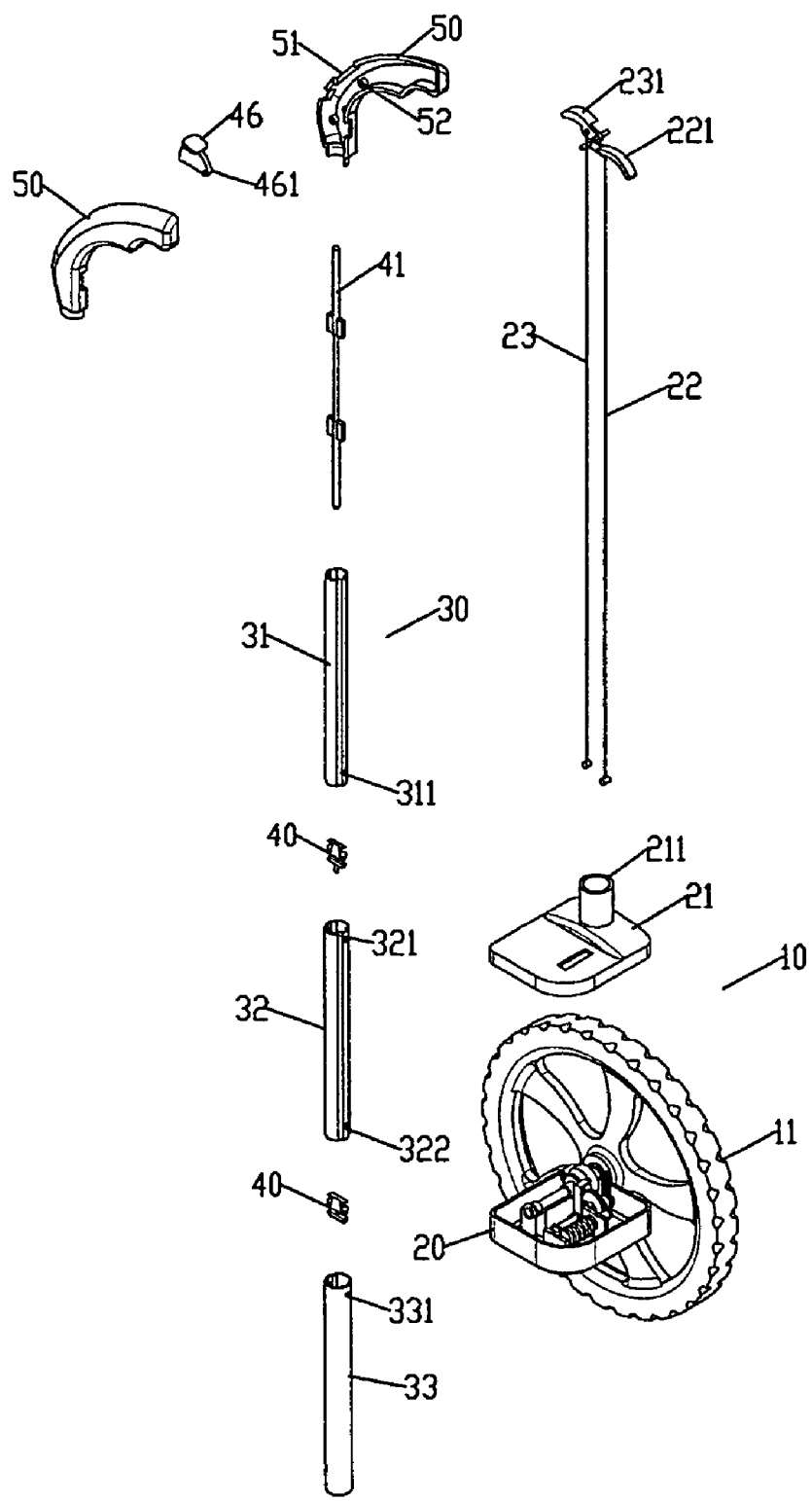
FIG. 16 is an exploded view to show a third embodiment of the positioning unit of the present invention.
Figure 18:
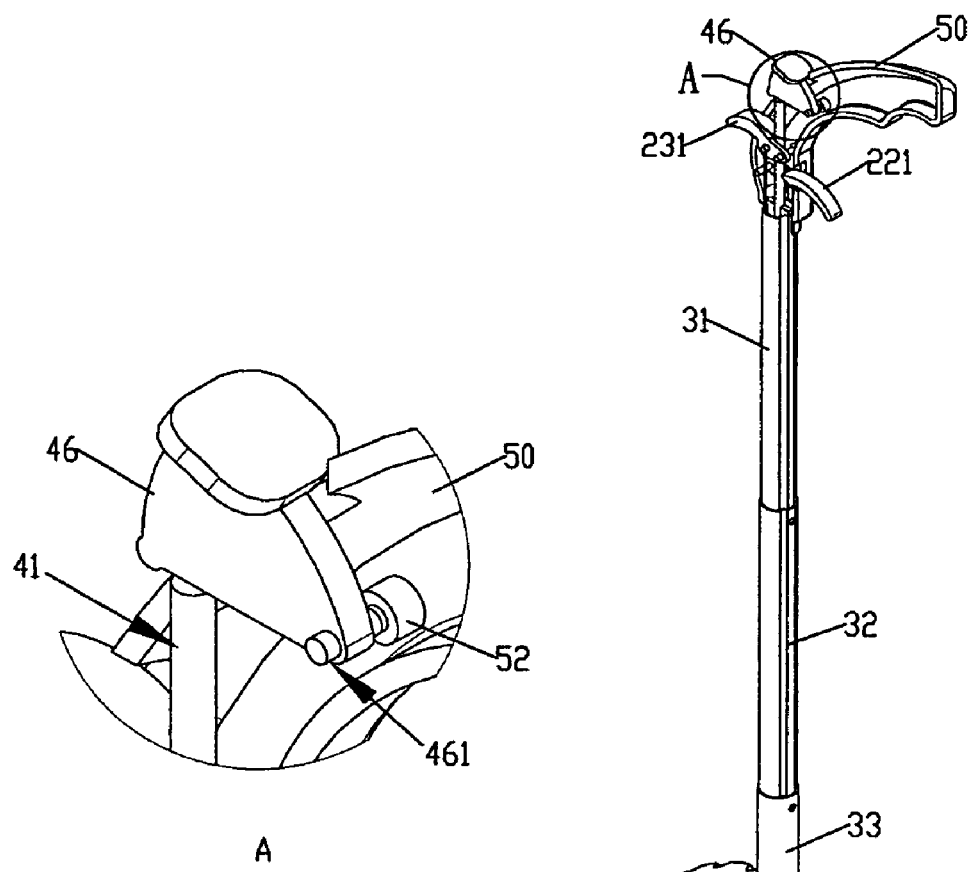
FIG. 18 is an enlarged view to show the portion circled by circle A in FIG. 17.
Figure 17:
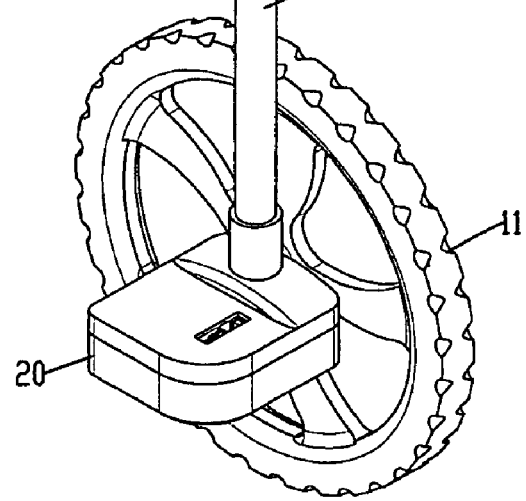
FIG. 17 is a perspective view to show the wheeled distance measuring device in FIG. 16 of the present invention.
Figures 19, 20:
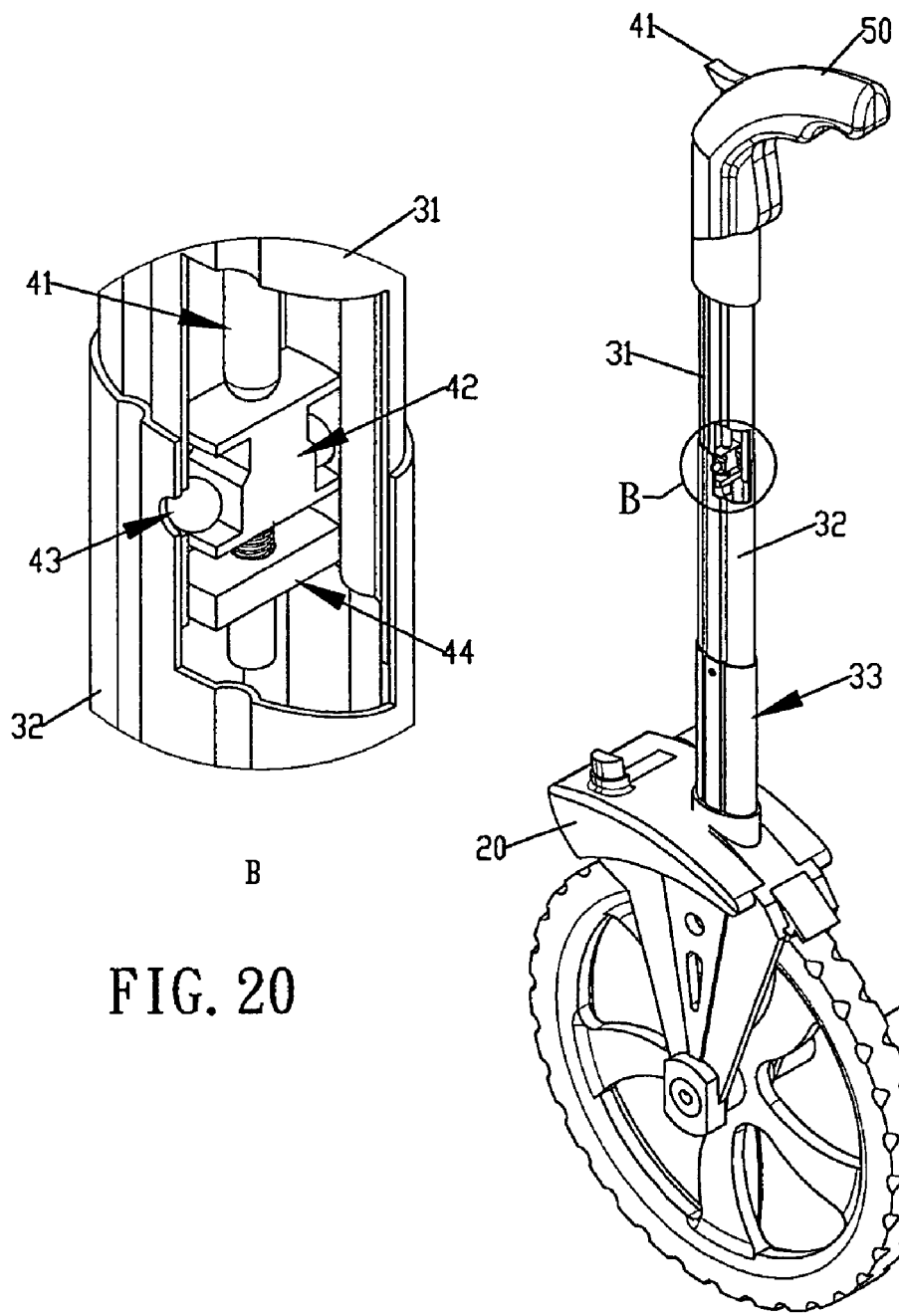
FIG. 19 is a perspective view, partly removed, to show the wheeled distance measuring device in FIG. 16 of the present invention.
FIG. 20 is an enlarged view to show the portion circled by circle B in FIG. 19.

Referring to FIGS. 4 to 10, the positioning members 43 of the first positioning unit 40 are engaged with the first and second holes 311, 321 when the first and second sections 31, 32 are in extended position. The positioning members 43 of the first positioning unit 40 are removed from the second holes 321 by pushing the action rod 41 to move the first piece 42 so that the first and second sections 31, 32 are retractable to each other. Similarly, the positioning members 43 of the second positioning unit 40 are engaged with the third and fourth holes 322, 331 when the second and third sections 32, 33 are in extended position and the positioning members 43 of the second positioning unit 40 are removed from the fourth holes 331 by moving the first piece 42 of the second positioning unit 40 so that the second and third sections 32, 33 are retractable to each other. The pole unit 30 is then adjustable to be a short section as shown in FIG. 11.

It is noted that, the first piece 42 of each of the first and second positioning units 40 is an I-shaped member and a first recess 421 and a second recess 422 are defined axially in each of the two sides of the first piece 42. The first and second recesses 421, 422 are in communication with each other. The positioning members 43 are movably received in the first and second recesses 421, 422. The two sides of the first piece 42 are engaged with the two grooves 313. The two sides of the first piece 42 are restricted by the two pairs of side walls 312. The second piece 44 of the first positioning unit 40 is received in the two grooves 313 of the first section 31 and the two sidewalls 312 position the second piece 44 within the grooves 313.

When the positioning members 43 are engaged with second recesses 422, the positioning members 43 are engaged with the first and second holes 311, 321 so as to set the first and second sections 31, 32 in extended position. When the first piece 42 is pushed toward by pushing the action rod 40, the positioning members 43 are engaged with the first recesses 421 and disengaged from the first holes 311 of the first section 31 so that the first and the second sections 31, 32 are movable relative to each other. A first notch 423 is defined in an underside of the first piece 42 of each of the first and second positioning units 40 and a second notch 441 is defined in a top of the second piece 44 of each of the first and second positioning units 40. A spring 45 has two respective ends engaged with the first and second notches 423, 441 so as to apply a force to separate the first and second pieces 42, 44. Therefore, when releasing the action rod 40, the first piece 42 is pushed upward by the spring 45 and the positioning members 43 are moved to the second recesses 422. Therefore, when adjusting the pole unit 30, the user simply presses the second end of the action rod 40 to move the first piece 42 of the first positioning unit 40, the first and second sections 31, 32 can be retracted to each other. The second piece 44 has an extension 442 extending from an underside thereof so that the first piece 42 of the second positioning unit 40 is pushed by the extension 442 of the first positioning unit 40 to activate the movement of the positioning members 43 of the second positioning unit 40 to retract the second section 32 into the third section 33 as shown in FIG. 11.

FIGS. 12 to 15 show a second embodiment of the present invention wherein, the only difference is the positioning unit 40. The first piece 42 of the positioning unit 40 of the second embodiment includes a push block 424 extending from an underside thereof and the push block 424 is a substantially triangular block and includes an inclined portion. There is only one positioning member 43 which is an elongate member and has a rounded end on a first end of the positioning member 43. A notch with an inclined surface 431 is defined in a top of the positioning member 43. The push block 424 is slidably engaged with the inclined surface 431 of the notch so that the positioning member 43 is moved transverse to the axis of the first and second sections 31, 32 when the push block 424 is moved downward to push the inclined surface 431. A spring 45 is biased between the inside of the first section 31 and a second end of the positioning member 43. The second piece 44 includes two side panels 443 on a top thereof and the positioning member 43 is movable between the two side panels 443. By this way, the positioning unit 40 involves less number of parts and is easily to be assembled.

FIGS. 16 to 20 show a third embodiment of the present invention and which is similar to the first embodiment except for a button 46 connected with the action rod 40 so that the user can conveniently operate the action rod 40. The button 46 has a pivot 461 which is pivotably connected to a reception member 52 in the handle 50, the action rod 41 is connected with the button 46. The button 46 protrudes from the handle 50 and the user can easily access the button 46 and activate the action rod 40 by pressing the button 46.

The pole unit 30 can be easily shortened for convenient of storage. The operation of the positioning units 40 is easy and the length of the pole unit 30 is adjusted according to the user's height. The number of the first, second, third and fourth holes can be set as needed to adjust the pole unit 30 into different lengths.

While we have shown and described the embodiment in accordance with the present invention, it should be clear to those skilled in the art that further embodiments may be made without departing from the scope of the present invention.

What is claimed is:

1. A wheeled distance measuring device (10) comprising:
a wheel (11) with a measuring unit (20) connected to a side of the wheel (11);
a pole unit (30) having a first section (31), a second section (32) and a third section (33), the first section (31) having two first holes (311) defined through a wall located close to a first end thereof and the first end of the first section (31) movably inserted into a first end of the second section (32), the second section (32) having two second holes (321) defined through a wall thereof and located close to the first end of the second section (32), two third holes (322) defined through the wall of the second section (32) and located close to a second end of the second section (32), the second end of the second section (32) movably inserted into a first end of the third section (33) which has two fourth holes (331) defined through a wall thereof, the fourth holes (331) located close to the first end of the third section (33) and a second end of the third section (33) connected with the measuring unit (20);
a first positioning unit (40) and a second positioning unit (40) located in the pole unit (30) and each of the first and second positioning units (40) including a first piece (42), two positioning members (43) and a second piece (44), the first positioning unit (40) located between the first and second sections (31, 32) and the second positioning unit (40) located between the second and third sections (32, 33), an action rod (41) having a first end inserted into the pole unit (30) via a second end of the first section (31) and the first end of the action rod (41) being in contact with the first piece (42) of the first positioning unit (40), the positioning members (43) of the first positioning unit (40) engaged with the first and second holes (311, 321) when the first and second sections (31, 32) are in extended position and the positioning members (43) of the first positioning unit (40) removed from the second holes (321) by pushing the action rod (41) to move the first piece (42) so that the first and second sections (31, 32) are retractable to each other,
the positioning members (43) of the second positioning unit (40) engaged with the third and fourth holes (322, 331) when the second and third sections (32, 33) are in extended position and the positioning members (43) of the second positioning unit (40) removed from the fourth holes (331) by moving the first piece (42) of the second positioning unit (40) so that the second and third sections (32, 33) are retractable to each other, and
a handle (50) connected to the second end of the first section (31) and including a slot (51) through which a second end of the action rod (41) extends.

2. The device as claimed in claim 1, wherein a cover (21) is connected to a top opening of the measuring unit (20) and includes a tube (211) extending from a top of the cover (21), the third section (33) is connected to the tube (211).

3. The device as claimed in claim 2, wherein a brake cable (22) and an initialization cable (23) extend through the pole unit (30) and the tube (211), the brake cable (22) is connected to and brakes the wheel (11) by pulling a brake key (221) pivotably connected to the handle (50), the initialization cable (23) is connected to the measuring unit (20) and initializes the measuring unit (20) by pulling an initialization key (231) pivotably connected to the handle (50).

4. The device as claimed in claim 1, wherein the first section (31) includes two grooves (312) defined axially in an inside thereof and two pairs of sidewalls (312) extend inward from the inside of the first section (31), the two grooves (312) are located between the two pairs of sidewalls (312), the first holes (311) are located to communicate with the grooves (312).

5. The device as claimed in claim 2, wherein the third section (33) is securely inserted in the tube (211).

6. The device as claimed in claim 4, wherein the first piece (42) is engaged between the two grooves (313) in the first section (31) and two sides of the first piece (42) are restricted by the two pairs of side walls (312).

7. The device as claimed in claim 1, wherein the first piece (42) of each of the first and second positioning units (40) includes a first recess (421) and a second recess (422) defined in each of two sides thereof, the first and second recesses (421, 422) are in communication with each other, when the positioning members (43) are engaged with second recesses (422), the positioning members (43) are engaged with the first and second holes (311, 321) so as to set the first and second sections (31, 32), when the first piece (42) is pushed toward, the positioning members (43) are engaged with the first recesses (421), the positioning members (43) are disengaged from the first holes (311) of the first section (31) so that the first and the second sections (31, 32) are movable relative to each other, a first notch (423) is defined in an underside of the first piece (42) of each of the first and second positioning units (40) and a second notch (441) is defined in a top of the second piece (44) of each of the first and second positioning units (40), a spring (45) has two respective ends engaged with the first and second notches (423, 441) so as to apply a force to separate the first and second pieces (42, 44).

8. The device as claimed in claim 7, wherein the first piece (42) of each of the first and second positioning units (40) is an I-shaped member and the first and second recesses (421, 422) are located axially in the two sides of the first piece (42).

9. The device as claimed in claim 4, wherein the second piece (44) of the first positioning unit (40) is received in the two grooves (313) of the first section (31) and the two sidewalls (312) position the second piece (44) within the grooves (313).

10. The device as claimed in claim 1, wherein the handle (50) is composed of two parts.

11. The device as claimed in claim 1, wherein the first piece (42) includes a push block (424) extending from an underside thereof and the push block (424) includes an inclined portion, the positioning member (43) is an elongate member including a rounded end on a first end thereof and has a notch with an inclined surface (431), the push block (424) is slidably engaged with the inclined surface (431) of the notch, a spring (45) is biased between the inside of the first section (31) and a second end of the positioning member (43).

12. The device as claimed in claim 11, wherein the second piece (44) includes two side panels (443) on a top thereof and the positioning member (43) is movable between the two side panels (443).

13. The device as claimed in claim 1, wherein a button (46) has a pivot (461) which is pivotably connected to a reception member (52) in the handle (50), the action rod (41) is connected with the button (46).

* * * * *